(12) United States Patent
Dong et al.

(10) Patent No.: US 6,445,554 B1
(45) Date of Patent: Sep. 3, 2002

(54) METHOD AND SYSTEM FOR PROVIDING EDGE-JUNCTION TMR FOR HIGH AREAL DENSITY MAGNETIC RECORDING

(75) Inventors: Zi-Weng Dong, Union City; Zhupei Shi, San Jose, both of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/523,025

(22) Filed: Mar. 10, 2000

(51) Int. Cl.⁷ .................................................. G11B 5/39
(52) U.S. Cl. .................................................. 360/324.2
(58) Field of Search .............................. 360/324.2, 324, 360/324.12

(56) References Cited

U.S. PATENT DOCUMENTS 6,178,074 B1 * 1/2001 Gill .......................... 360/324.2
6,185,079 B1 * 2/2001 Gill .......................... 360/324.2

* cited by examiner

*Primary Examiner*—George J. Letscher
(74) *Attorney, Agent, or Firm*—Sawyer Law Group LLP (57) ABSTRACT

A method and system for providing a magnetoresistive sensor for reading data from a recording media is disclosed. The method and system include providing a first barrier layer and a second barrier layer and providing a free layer disposed between the first barrier layer and the second barrier layer. The free layer is ferromagnetic. The method and system also include providing a first pinned layer and a second pinned layer. The first pinned layer and the second pinned layer are ferromagnetic. The first barrier layer is disposed between the first pinned layer and one edge of the free layer. The second barrier layer is disposed between the second pinned layer and another edge of the free layer. The method and system also include providing a first antiferromagnetic layer and a second antiferromagnetic layer. The first pinned layer is magnetically coupled to the first antiferromagnetic layer. The second pinned layer is magnetically coupled to the second antiferromagnetic layer. The first barrier layer is sufficiently thin to allow tunneling of charge carriers between the first pinned layer and the free layer. The second barrier layer is sufficiently thin to allow tunneling of charge carriers between the second pinned layer and the free layer. A longitudinal bias current through the tunneling junctions at the two edges of the free layer achieves a large MR ratio.

8 Claims, 9 Drawing Sheets

Prior Art

Figure 1A

Prior Art

Figure 6F

METHOD AND SYSTEM FOR PROVIDING EDGE-JUNCTION TMR FOR HIGH AREAL DENSITY MAGNETIC RECORDING

FIELD OF THE INVENTION

The present invention relates to magnetic recording, and more particularly to a method and system for providing a tunneling magnetoresistance recording junction suitable for high areal density magnetic recording.

BACKGROUND OF THE INVENTION

Figure 1A:
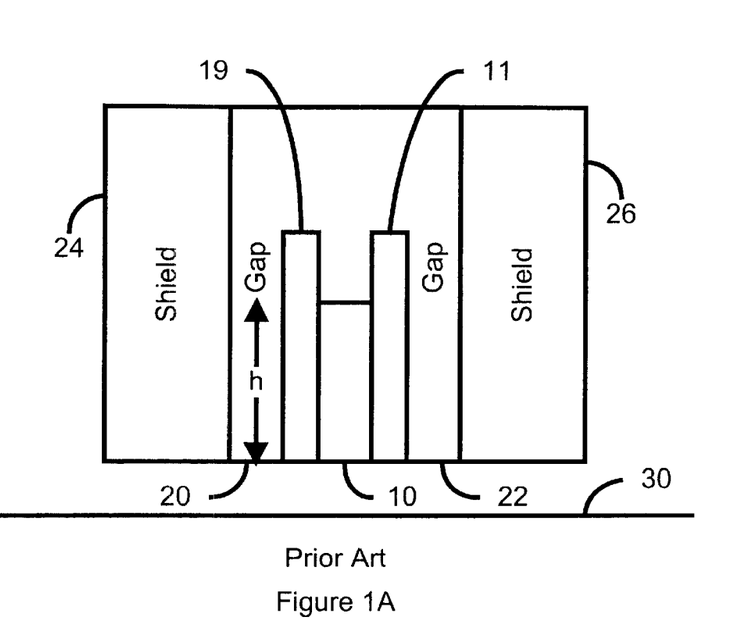
FIG. 1A is a side view of a conventional TMR sensor.

Tunneling magnetoresistive ("TMR") junctions have recently become of interest for potential use in reading recording media in a magnetoresistive ("MR") head. FIG. 1A depicts diagrams of a conventional TMR sensor 10 as viewed from the side. FIG. 1A depicts the shields first and second shields 24 and 26, first and second gaps 20 and 22, leads 11 and 19, and the TMR sensor 10.

Figure 1B:
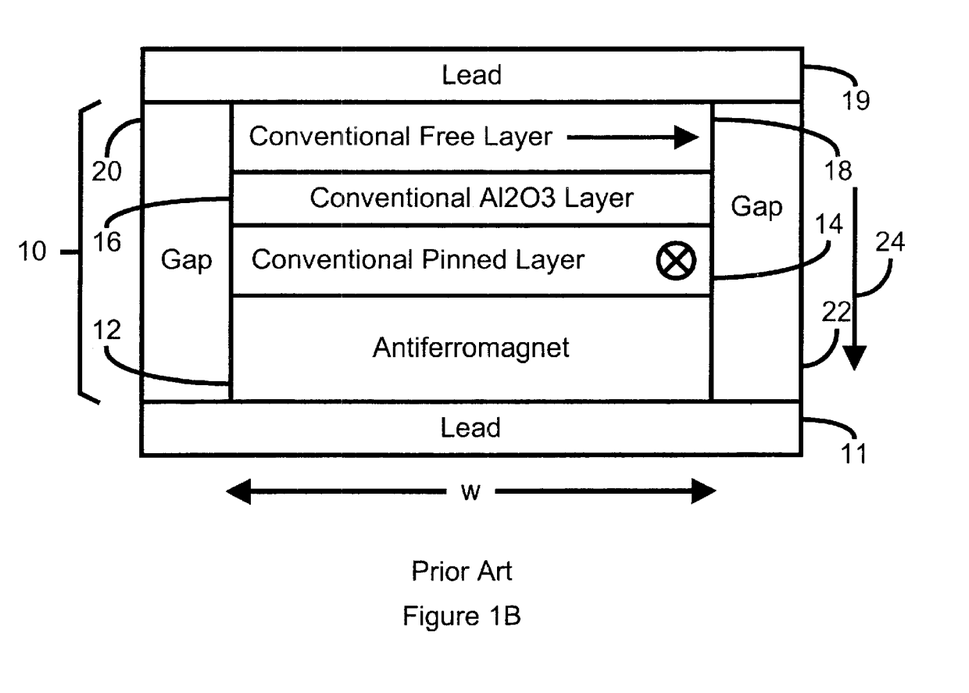
FIG. 1B is a diagram of the conventional TMR sensor as viewed from an airbearing surface.

FIG. 1B depicts the conventional TMR sensor 10 as viewed from the side and from an air-bearing surface or magnetic material with which the TMR sensor 10 is being used. In addition to the TMR sensor 10, FIG. 1B depicts leads 11 and 19 and first and second gaps 20 and 22, respectively. Not depicted in FIG. 1B are conventional shields 24 and 26, which partially surround the conventional TMR sensor 10. The conventional TMR sensor 10 includes a conventional antiferromagnetic ("AFM") layer 12, a conventional pinned layer 14, a conventional barrier layer 16, and a conventional free layer 18. The TMR junction for the TMR sensor 10 includes the interfaces between the conventional pinned layer 14, the conventional barrier layer 16 and the conventional free layer 18. Also depicted are portions of gaps 20 and 22 that surround a portion of the TMR sensor 10. The conventional pinned layer 14 and conventional free layer 18 are ferromagnetic. The conventional pinned layer 14 has its magnetization fixed, or pinned, in place because the conventional pinned layer 14 is magnetically coupled to the conventional AFM layer 12. The conventional antiferromagnetic layer 12 is approximately one hundred to three hundred Angstroms thick. The conventional pinned layer 14 is approximately twenty to one hundred Angstroms thick. The conventional barrier layer 16 is typically five to twenty Angstroms thick and the conventional free layer 18 is typically thirty to one hundred Angstroms thick.

The magnetization of the conventional free layer 18 of the TMR sensor 10 is biased in the plane of the page when there is no external magnetic field, but is free to rotate in response to an external magnetic field. The conventional free layer 18 is typically composed of Co, $Co_{90}Fe_{10}$, or a bilayer of $Co_{90}Fe_{10}$ and permalloy. The magnetization of the conventional pinned layer 14 is pinned perpendicular to the plane of the page. The conventional pinned layer 14 is typically composed of Co, Fe, or Ni. The conventional barrier layer 16 is typically composed of aluminum oxide ($Al_2O_3$).

For the conventional TMR sensor 10 to function, a bias current is driven between the leads 11 and 19, perpendicular to the plane of the layers 12, 14, 16 and 18 of the conventional TMR sensor 10. Thus, the TMR sensor 10 is known as a current perpendicular to the plane ("CPP") junction. The direction of flow of the bias current is depicted by the arrow 24. The MR effect in the conventional TMR sensor 10 is believed to be due to spin polarized tunneling of electrons between the conventional free layer 18 and the conventional pinned layer 14. Thus, spin polarized electrons tunnel through the conventional barrier layer 16 in order to provide the magnetoresistive effect. When the magnetization of the conventional free layer 18 is parallel or antiparallel to the magnetization of the conventional pinned layer 14, the resistance of the conventional TMR. sensor 10 is minimized or maximized, respectively. In addition, the magnetization of the conventional free layer 18 is biased to be perpendicular to the magnetization of the conventional pinned layer 14 when no external field is applied, as depicted in FIG. 1B. The magnetoresistance, MR, of a MR sensor is the difference between the maximum resistance and the minimum resistance of the MR sensor. The MR ratio of the MR sensor is typically called $\Delta R/R$, and is typically given as a percent. A typical magnetoresistance of the conventional TMR sensor is approximately twenty percent.

The conventional TMR sensor 10 is of interest for MR sensors for high areal density recording applications. Currently, higher recording densities, for example over 40 gigabits ("Gb") per square inch, are desired. When the recording density increases, the size of and magnetic field due to the bits decrease. Consequently, the bits provide a lower signal to a read sensor. In order to maintain a sufficiently high signal within a MR read head, the signal from the read sensor for a given magnetic field is desired to be increased. One mechanism for increasing this signal would be to use an MR sensor having an increased MR ratio. The conventional TMR sensor 10 has an MR of approximately twenty percent, which is higher than a conventional giant magnetoresistance ("GMR") sensor having a nonmagnetic conducting layer separating a free layer and a pinned layer. Furthermore, the conventional TMR sensor 10 has a smaller thickness than a conventional GMR sensor, allowing for a smaller spacing between shields (not shown). The smaller spacing between shields allows for more effective shielding of bits not desired to be read by the TMR sensor 10. The width of the TMR sensor 10, shown in FIG. 1, can be narrower than a conventional GMR sensor. This also aids in allowing the conventional TMR sensor 10 to read smaller bits at higher recording densities.

Although the conventional TMR sensor 10 is of interest for high-density recording applications, one of ordinary skill in the art will readily realize that there are several drawbacks to the conventional TMR sensor 10. Some of these drawbacks are due to the area of the conventional TMR sensor 10. In particular, the conventional TMR sensor 10 often has a nonuniform bias current and may have a reduced MR ratio due to the large area of the TMR sensor 10. The area of the conventional TMR junction includes the area of the interfaces between the conventional pinned layer 14, the conventional free layer 18 and the conventional barrier layer 18. The junction area is defined by the width of the conventional TMR sensor 10, w, depicted in FIG. 1B, and the length of the conventional TMR sensor 10 Into the plane of the page depicted in FIG. 1B. The length of the conventional TMR sensor 10 is determined by the stripe height, h, of the conventional TMR sensor 10 as depicted in FIG. 1A. The width w of the conventional TMR sensor 10 is determined by the track width (not shown) of the media desired to be read and is typically approximately half of the track width. Thus, the junction area for the conventional TMR sensor 10 is the width multiplied by the stripe height (w×h). The area of the conventional TMR junction for the conventional TMR sensor 10 is typically on the order of one square micrometer. As discussed above, the conventional barrier layer 16 is typically between five and twenty Angstroms thick. Because the conventional barrier layer 16 has such a large area but is so thin, pinholes (not shown in FIG. 1) often exist in the conventional barrier layer 16. Current more easily flows between the conventional pinned layer 14 and the conventional free layer 18 through these pinholes than through the conventional barrier layer 16. As a result, the bias current between the leads 11 and 19 is nonuniform. In addition, because electrons pass readily through these pinholes, the electrons do not undergo spin polarized tunneling. As a result, the MR effect for the conventional TMR sensor 10 can be reduced by the electrons which pass through the pinholes instead of tunneling through the conventional barrier layer 16. Consequently, not only may the bias current lack uniformity, but the MR ratio for the conventional TMR sensor 10 may also be reduced below the intrinsic percentage (approximately twenty percent).

There are further drawbacks to use of the conventional TMR sensor 10. The conventional free layer 18, the conventional barrier layer 16 and the conventional pinned layer 14 are two metallic layers separated by an insulating layer. As a result, the conventional free layer 18, the conventional barrier layer 16 and the conventional pinned layer 14 form a parasitic capacitor. In part because of the large junction area, the parasitic capacitance of the conventional TMR sensor 10 is relatively large. A parasitic capacitance slows the response of the conventional TMR sensor 10. The characteristic time constant for this delay is proportional to the capacitance of the TMR sensor 10. Because the capacitance is larger than desired, the delay is larger than desired. As a result, the response of the conventional TMR sensor 10 is relatively slow and results in a slow data transfer rate.

In addition, the conventional TMR sensor 10 is fabricated and used in the CPP orientation. Typical conventional GMR sensor are fabricated such that a bias current can be driven parallel to the plane of the layers of the conventional GMR sensor. In other words, the conventional GMR sensor is fabricated and used in a current in plane ("CIP") configuration. As a result, it may be difficult to fabricate the conventional TMR sensor 10 using methods developed for the conventional GMR sensor. As a result, the conventional TMR sensor 10 may be relatively difficult to manufacture. Moreover, although the intrinsic MR ratio for the conventional TMR sensor 10 is higher than for a conventional GMR sensor, a higher practical MR ratio is still desired.

Accordingly, what is needed is a system and method for providing a manufacturable TMR junction that is capable of being used in high-density magnetic recording. The present invention addresses such a need.

SUMMARY OF THE INVENTION

The present invention provides a method and system for providing a magnetoresistive sensor for reading data from a recording media. The method and system comprise providing a first barrier layer and a second barrier layer and providing a free layer disposed between the first barrier layer and the second barrier layer. The free layer is magnetic. The method and system also comprise providing a first pinned layer and a second pinned layer. The first pinned layer and the second pinned layer are magnetic. The first barrier layer is disposed between the first pinned layer and the free layer. The second barrier layer is disposed between the second pinned layer and the free layer. The method and system also comprise providing a first antiferromagnetic layer and a second antiferromagnetic layer. The first pinned layer is magnetically coupled to the first antiferromagnetic layer. The second pinned layer is magnetically coupled to the second antiferromagnetic layer. The first barrier layer is sufficiently thin to allow tunneling of charge carriers between the first pinned layer and the free layer. The second barrier layer is sufficiently thin to allow tunneling of charge carriers between the second pinned layer and the free layer.

According to the system and method disclosed herein, the present invention provides a magnetoresistive sensor that has a higher magnetoresistive ratio, is relatively simple to fabricate, which is less subject to nonuniform bias current, and which is suitable for high areal density recording applications.

DETAILED DESCRIPTION OF THE INVENTION

The present invention relates to an improvement in magnetic recording technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional TMR sensors are of interest for high areal density recording applications. For example, current conventional TMR sensors are of interest for reading materials recorded at a density of on the order of forty $Gb/in^2$ and higher. However, one of ordinary skill in the art will readily realize that there are several drawbacks to conventional TMR sensors. Conventional TMR sensors have a large junction area and, therefore, are subject to pinholes that cause a nonuniform bias currents and a reduced MR ratio. In addition, conventional TMR sensors have a relatively large capacitance, which causes a slower response and lower data transfer rates. Finally, a higher signal from the MR ratio of the sensor is still desired, particularly for higher densities of over forty $Gb/in^2$, including a recording density of one hundred $Gb/in^2$.

The present invention provides a method and system for providing a magnetoresistive sensor for reading data from a recording media. The method and system comprise providing a first barrier layer and a second barrier layer and providing a free layer disposed between the first barrier layer and the second barrier layer. The free layer is magnetic. The method and system also comprise providing a first pinned layer and a second pinned layer. The first pinned layer and the second pinned layer are magnetic. The first barrier layer is disposed between the first pinned layer and the free layer. The second barrier layer is disposed between the second pinned layer and the free layer. The method and system also comprise providing a first antiferromagnetic layer and a second antiferromagnetic layer. The first pinned layer is magnetically coupled to the first antiferromagnetic layer. The second pinned layer is magnetically coupled to the second antiferromagnetic layer. The first barrier layer is sufficiently thin to allow tunneling of charge carriers between the first pinned layer and the free layer. The second barrier layer is sufficiently thin to allow tunneling of charge carriers between the second pinned layer and the free layer.

The present invention will be described in terms of particular embodiments of a TMR sensor. However, one of ordinary skill in the art will readily recognize that this method and system will operate effectively for alternate embodiments using other materials or having other components. In addition, the present invention is described in the context of particular methods for forming a TMR sensor in accordance with the present invention. However, one of ordinary skill in the art will readily recognize that the present invention is consistent with other methods employing different steps in alternate orders.

Figure 2A:
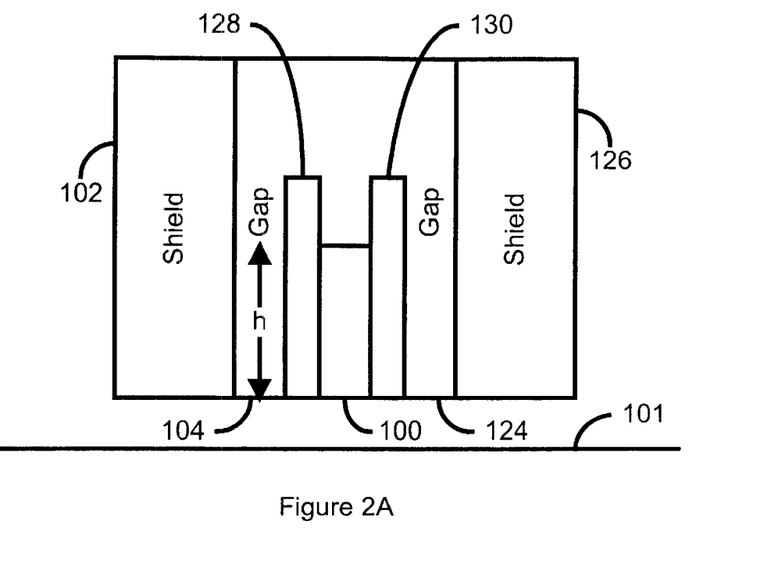
FIG. 2A is a side view of one embodiment of a TMR sensor in accordance with the present invention.
Figure 2B:
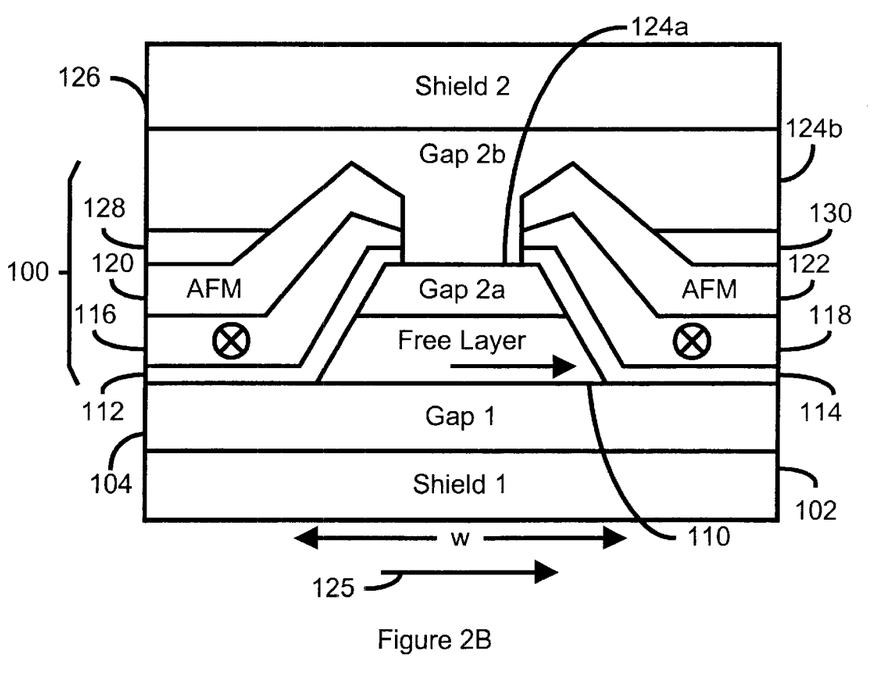
FIG. 2B is a diagram of one embodiment of the TMR sensor in accordance with the present invention as viewed from an air-bearing surface.

To more particularly illustrate the method and system in accordance with the present invention, refer now to FIGS. 2A and 2B, depicting a side view and air-bearing surface view, respectively, of a TMR sensor 100 in accordance with the present invention. FIG. 2A depicts the TMR sensor 100, first lead 128, second lead 130, first gap 104, second gap 124, first shield 102 and second shield 126. The stripe height, h, of the TMR sensor 100 and the air-bearing surface of the magnetic material 101 desired to be read are also depicted in FIG. 2A. The first shield 102 and second shield 126 are magnetically permeable and thus generally conductive. The first and second shields 102 and 126, respectively, shield the TMR sensor 100 from exposure to magnetic fields other than that of the bit (not explicitly indicated in FIG. 2A) in the magnetic material 101 that is desired to be read. The first gap 104 and the second gap 124 are typically insulators and electrically isolate the TMR sensor 100 from the shields 102 and 126. The first gap 104 is preferably on the order of one hundred to five hundred Angstroms in thickness and composed of aluminum oxide. The second gap 124 is preferably approximately one hundred to four hundred Angstroms in thickness and composed of aluminum oxide.

FIG. 2B depicts the TMR sensor 100 as viewed from the air bearing surface, or the magnetic material 101 shown in FIG. 2A. FIG. 2B depicts the TMR sensor 100, first gap 104, second gap 124, first shield 102, second shield 126, and leads 128 and 130. Note that the second gap 124 is depicted as having two separate portions, the second gap A 124a and the second gap B 124b. The TMR sensor 100 includes a free layer 110, a first barrier layer 112, a second barrier layer 114, a first pinned layer 116, a second pinned layer 118, a first antiferromagnetic ("AFM") layer 120 and a second AFM layer 122. In addition, a seed layer may be provided between the free layer 110 and the first gap 104. Such a seed layer would preferably be composed of a tantalum layer having a thickness of approximately twenty to fifty Angstroms. A capping layer may also be provided between the free layer 110 and the second gap a 124a. Such a capping layer is preferably formed of tantalum having a thickness of approximately twenty to fifty Angstroms.

The free layer 10 is ferromagnetic and is preferably between approximately twenty and one hundred Angstroms. The free layer 110 preferably includes NiFe, Co, CoFe, Ni, or some combination thereof. In one preferred embodiment, the free layer 110 is NiFe having approximately nineteen percent Fe. The pinned layers 116 and 118 are magnetic and preferably have a thickness between approximately thirty and one hundred Angstroms. The pinned layers 116 and 118 preferably include Co, CoFe, Ni, NiFe or some combination thereof. The pinned layers 116 and 118 are magnetically coupled to the AFM layers 120 and 122, respectively. The materials used in the pinned layers 116 and 118 and the free layer 110 are preferably selected to increase the MR ration for the TMR junction 100. The MR ratio for a TMR junction is proportional to 2P1P2/(1+P1P2), where P1 and P2 are the spin polarizations of the free layer and pinned layer, respectively, for the junction. The spin polarizations are typically expressed as a percentage. Thus, the materials for the pinned layers 116 and 118 and the free layer 110 are preferably selected to have a higher spin polarization, resulting in a higher MR ratio. Note, however, that the materials used in free layer 110 should also be selected to have a low coercivity, allowing the free layer 110 to easily respond to an external magnetic field. The preferred materials for the pinned layers 116 and 118 and the free layer 110, discussed above, are selected with these considerations in mind.

The first and second barrier layers 112 and 114, respectively, are preferably between approximately five and fifty Angstroms in thickness. The barrier layers 112 and 114 are thin enough to allow spin polarized tunneling of charge carriers (e.g. electrons) between the free layer 110 and the pinned layers 116 and 118, respectively. The barrier layers 112 and 114 preferably include aluminum oxide. The AFM layers 120 and 122 are preferably between approximately fifty and five hundred Angstroms. The AFM layer 120 and 122 preferably include PtMn, MnFe or IrMn. However, nothing prevents the use of other materials in the TMR sensor 100. Moreover, as depicted in FIG. 2B, the magnetizations of the pinned layers 116 and 118 are preferably biased perpendicular to the magnetization of the free layer 110 in the absence of an external magnetic field. Thus, the magnetizations of the pinned layers 116 and 118 are preferably pinned out of the plane of the page.

As depicted in FIG. 2B, the TMR sensor 100 preferably includes two TMR junctions. One TMR junction is formed by the first pinned layer 116, the first barrier layer 112 and the free layer 110. The second TMR junction is formed by the second pinned layer 118, the second barrier layer 114 and the free layer 110. Thus, the TMR junctions for the TMR sensor 100 are preferably formed at the edges of the free layer 110. Because of the geometry of the TMR junctions for the TMR sensor 100, current is driven in the direction depicted by the arrow 125. Thus, the TMR sensor 100 is thus a current in plane ("CIP") sensor, similar to current GMR sensors.

Because the TMR junctions for the TMR sensor 100 are at the edges of the free layer 110, the area of each TMR junction is significantly reduced. As can be seen in FIG. 2B, the area of each TMR junction is the thickness of the free layer 110 multiplied by the stripe height, h, which is into the plane of the page in FIG. 2B. Thus, the area of each TMR junction is decoupled from the width, w, of the free layer 110. The thickness of the free layer 110 is preferably on the order of approximately ten to three hundred Angstroms. Assuming the stripe height for the TMR sensor 100 is approximately the same as a conventional TMR sensor 10, the area for each of the TMR junctions in the TMR sensor 100 is substantially less than for the conventional TMR sensor 10. This is significantly reduces the surface area of each TMR junction in the TMR sensor from that of a conventional TMR sensor 10 depicted in FIGS. 1A and 1B.

Referring back to FIGS. 2A and 2B, because the areas of the TMR junctions in the TMR sensor 100 are greatly reduced, the TMR sensor 100 enjoys several advantages over a conventional TMR sensor 10. The reduction in the areas of the TMR junctions for the TMR sensor 100 reduces the probability of pinholes in the barrier layers 112 and 114. As a result, the TMR sensor 100 has a more uniform bias current. In addition, there is a smaller probability of reduction in the MR ratio of the TMR sensor 100 due to the electrons passing through pinholes instead of tunneling through the barrier layers 112 and 114. Furthermore, the reduction in the TMR junction area also reduces the parasitic capacitance for the TMR sensor 100. As a result, the response time of the TMR sensor 100 is improved and the data transfer rate using the TMR sensor 100 can be increased. Furthermore, because the TMR junctions of the TMR sensor 100 have smaller areas, a smaller bias current can be used. For example, the conventional TMR sensor 10 depicted in FIGS. 1A and 1B utilizes a bias current on the order of four to five milliamps. In contrast, in one embodiment the TMR sensor 100 may use a bias current of between ten and one hundred microamps. Use of a lower bias current allows the TMR sensor 100 to have reduced power dissipation, which is desirable.

The TMR sensor 100 also has an increased signal. As discussed above, the TMR sensor 100 has two TMR junctions, one at each edge of the free layer 110. The bias current is also driven parallel to the plane of the page, in the direction depicted by arrow 125. This is because the bias current is driven between the leads 128 and 130 As a result, the current passes through two TMR junctions when traveling between the leads 128 and 130. Thus, the signal from the TMR sensor 100 may be twice what it would be for the conventional TMR sensor 10, depicted in FIGS. 1A and 1B, because the TMR sensor 100 of FIGS. 2A and 2B includes two TMR junctions rather than just one. Thus, the TMR sensor 100 has an increased signal, which makes the TMR sensor 100 more suitable for higher density recording application.

In addition, in a preferred embodiment, the free layer 110 is single domain, making magnetic biasing for the TMR sensor 100 unnecessary. If the free layer 110 has multiple magnetic domains, then when the magnetization of the free layer 110 responds to an external magnetic field, the walls of the domains move. This domain wall motion can be a source of non-repeatable noise, which is undesirable. This noise can be avoided by ensuring that the free layer 110 has a single magnetic domain. In GMR sensors, the free layer is magnetically biased by hard magnets in order to ensure that the free layer has a single domain.

However, if the free layer 110 is small enough, the free layer will be single domain. In general, a free layer 110 will be single domain if its width, w, approximately less than or equal to ten times the exchange length for the material of which the free layer 110 is made. For a free layer 110 that is made of pernalloy (NiFe having approximately nineteen percent Fe), the free layer 110 will be single domain if the free layer 110 has a width that is less than or equal to approximately 0.1 micron. Thus, in a preferred embodiment, the free layer 110 is less than or equal to 0.1 micron in length. As a result, in a preferred embodiment, the free layer 110 is single domain without magnetic biasing.

Figure 3:
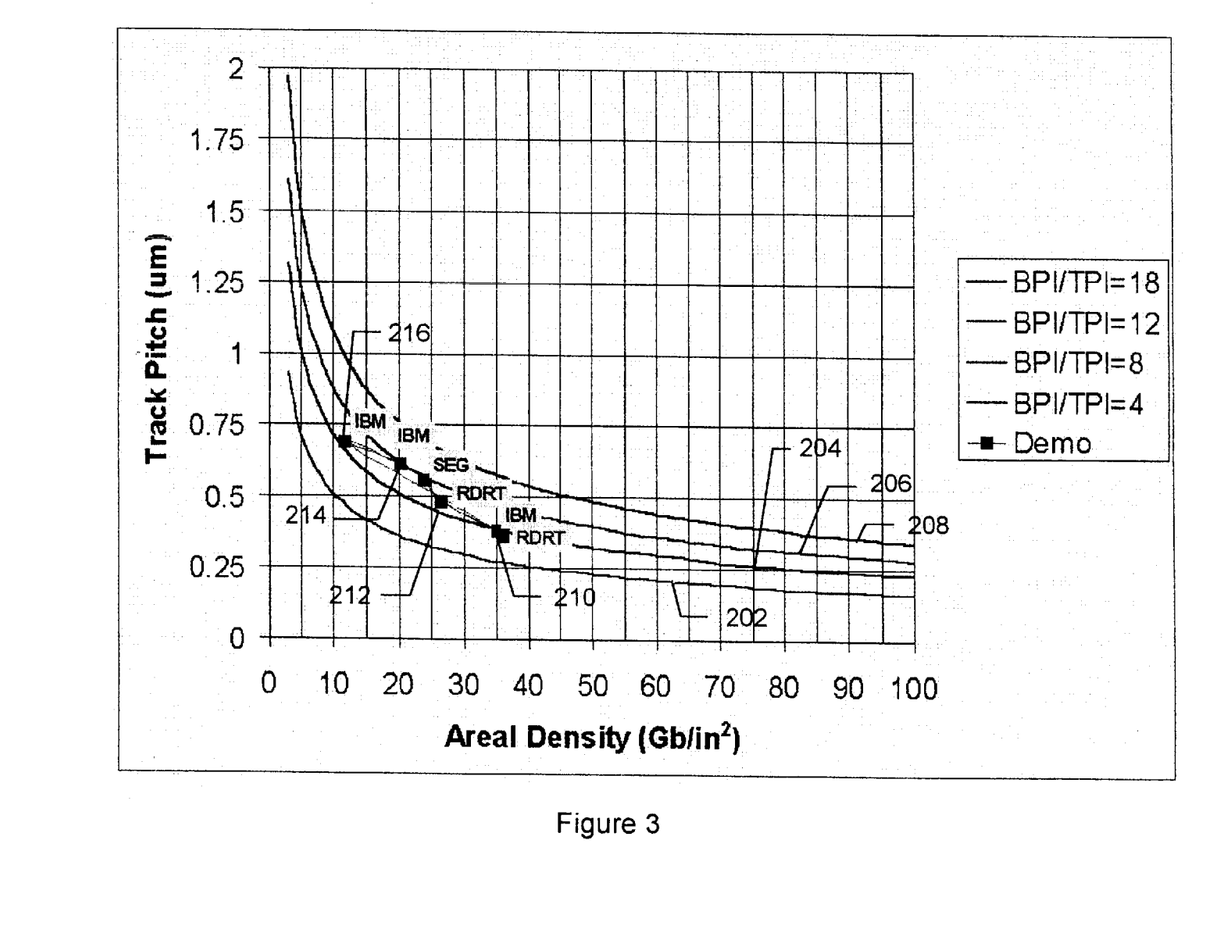
FIG. 3 is a graph depicting the relationship between the areal density and track pitch for different bit aspect ratios (bits per inch/tracks per inch).

Also in a preferred embodiment, the free layer 110 having a width of approximately 0.1 micron is suitable for reading a magnetic material having a recording density of approximately one hundred $Gb/in^2$. The size of a bit can be described by the bits per inch ("BPI") along the track and the tacks per inch ("TPI"). FIG. 3 is a graph of the track pitch versus areal density for four curves, 202, 204, 206 and 208. The curves 202, 204, 206 and 208 represent a BPI/TPI ratio of 4, 8, 12 and 18, respectively. Points 210, 212, 214 and 216 depict experimental results for media having a particular areal density. The highest areal density media is depicted by the point 210. The point 210 represents a BPI/TPI of 7.8 and an areal density of 35.3 $Gb/in^2$. As can be seen from the progression of the points 216 to 210 to higher areal densities, the BPI decreases more rapidly than the TPI. In other words, the BPI/TPI decreases for higher areal densities. Thus, a smaller bit aspect ratio is also beneficial because the signal to noise ratio decreases for smaller bit aspect ratios. It is currently believed that a BPI/TPI of approximately four and a track pitch of about 0.2 micron will result in an areal density of approximately one hundred $Gb/in^2$.

The width of the free layer 110 is preferably approximately one-half of the track pitch. Thus, a free layer 110 having a width of approximately 0.1 micron should be suitable for a track pitch of approximately 0.2 micron and, therefore, an areal density of approximately one hundred $Gb/in^2$. Thus, in a preferred embodiment, the TMR sensor 100 is suitable for use with a one hundred $Gb/in^2$ media when the free layer 110 has a width that is small enough to ensure that the free layer 110 is single domain. Moreover, as discussed above, the TMR sensor 100 has a higher MR ratio, while having a higher data transfer rate. Thus, the TMR sensor 100 can be used for very high recording densities, including densities of one hundred $Gb/in^2$.

In addition to the above-mentioned benefits, the TMR sensor 100 is relatively simple to manufacture. This simplicity comes in part from the fact that the TMR sensor 100 is in a CIP configuration and can thus be manufactured using very similar techniques to conventional CIP GMR sensors. In other words, it is relatively simple to integrate the processing of the TMR sensor 100 into current processing technologies.

Figure 4:
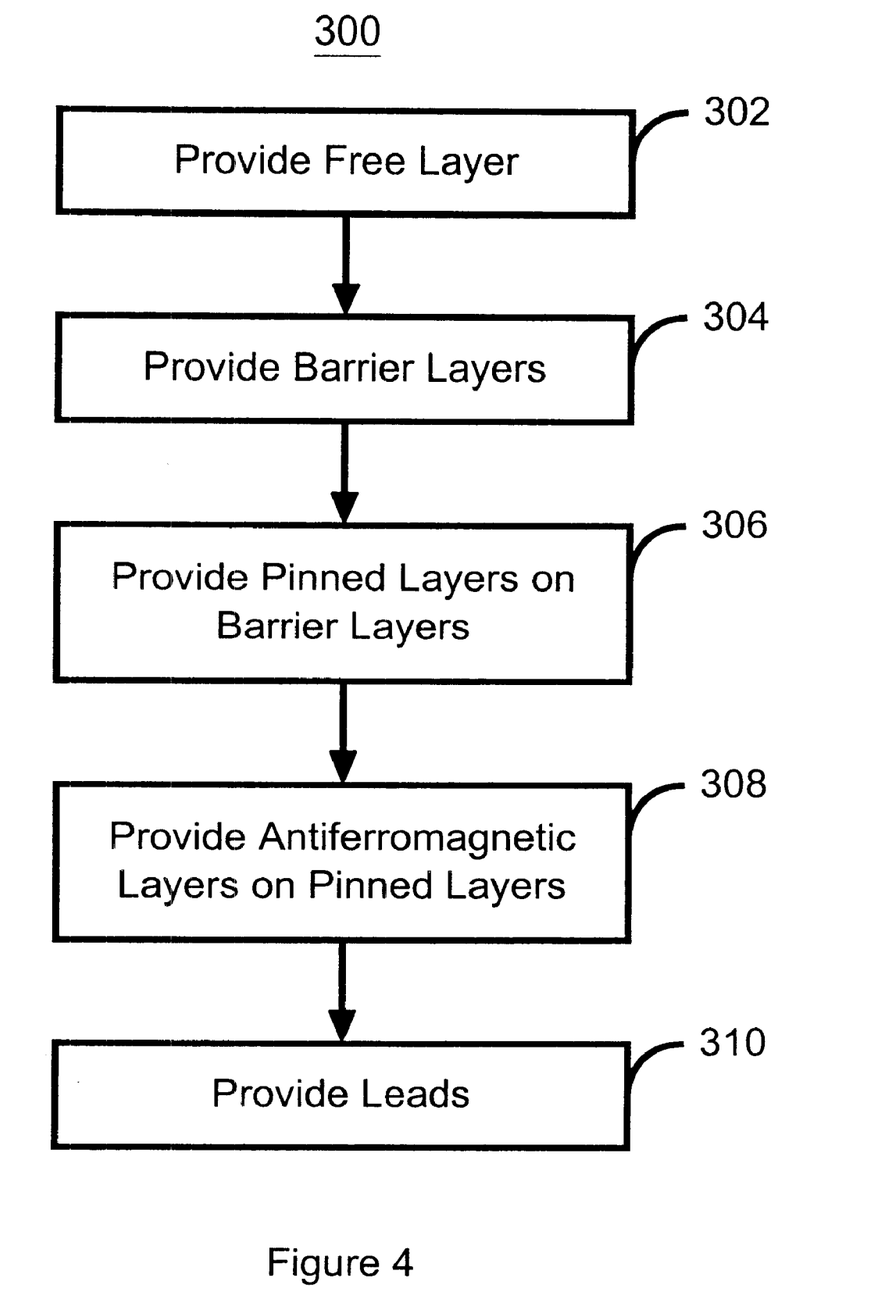
FIG. 4 is a high-level flow chart of a method in accordance with the present invention for providing a TMR sensor in accordance with the present invention.

To more particularly describe this advantage of the present invention, refer to FIG. 4, which depicts a high-level flow chart of a method 300 for providing a TMR sensor in accordance with the present invention. The free layer 110 is provided, via step 302. The free layer 110 is preferably made up of approximately twenty to one hundred Angstroms of permalloy. The barrier layers 112 and 114 are provided, via step 304. The barrier layers 112 and 114 are preferably formed of five to twenty Angstroms of aluminum oxide. The barrier layers 112 and 114 will preferably remain at the edges of the free layer. The pinned layers 116 and 118 and the AFM layers 120 and 122 are provided, via steps 306 and 308, respectively. The pinned layers 116 and 118 are provided on the barrier layers 112 and 114. The pinned layers 116 and 118 are preferably between thirty and one hundred Angstroms of a magnetic material having a high spin polarization, such as CoFe or NiFe. The AFM layers 120 and 122 are provided on the pinned layer 116 and 118. The AFM layer 120 and 122 are preferably between fifty and three hundred Angstroms of a material such as PtMn, MnFe or IrMn. The leads are provided, via step 310, allowing current to be driven to and from the TMR sensor 100.

Figure 5:
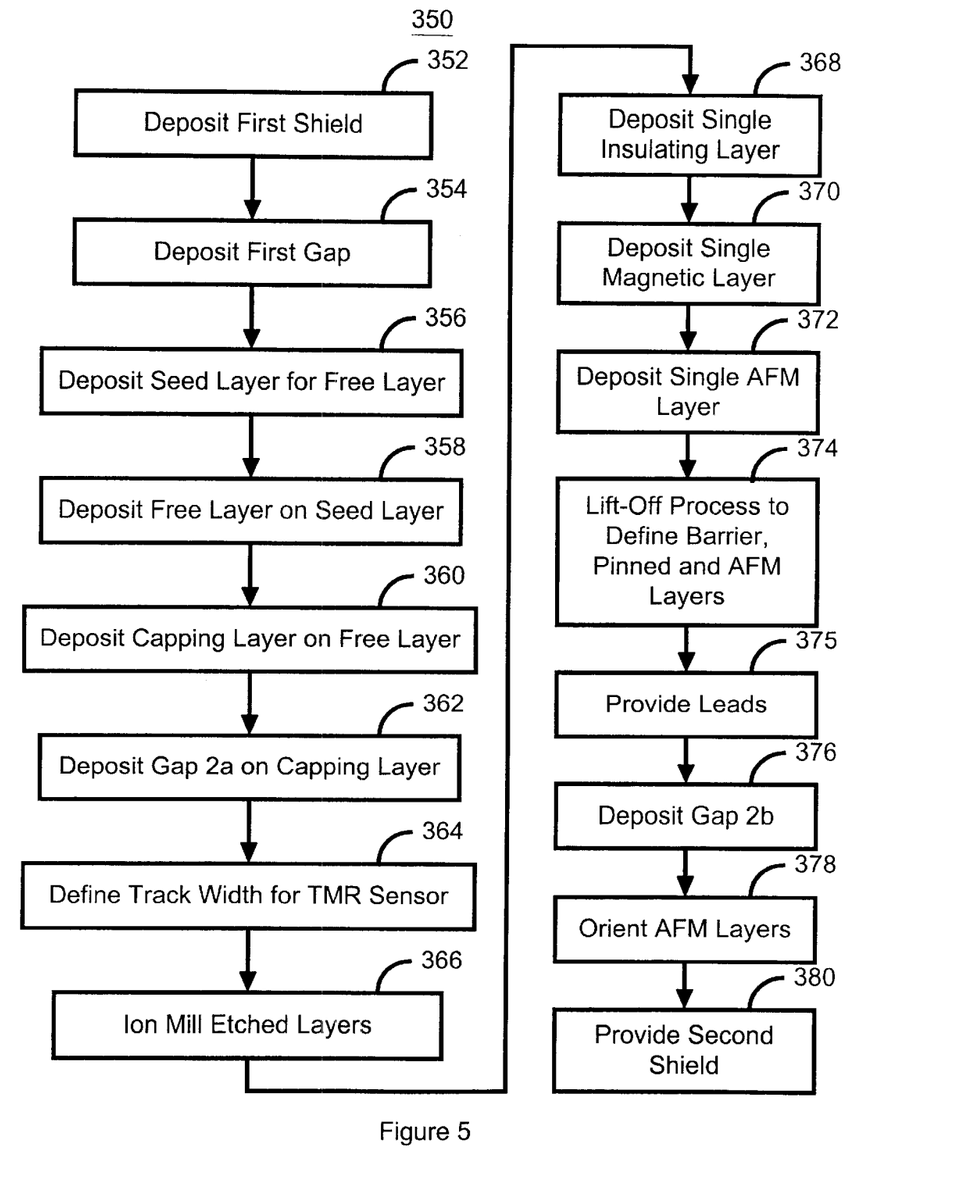
FIG. 5 is a more detailed flow chart of a method in accordance with the present invention for providing a TMR sensor in accordance with the present invention.
Figure 6A:
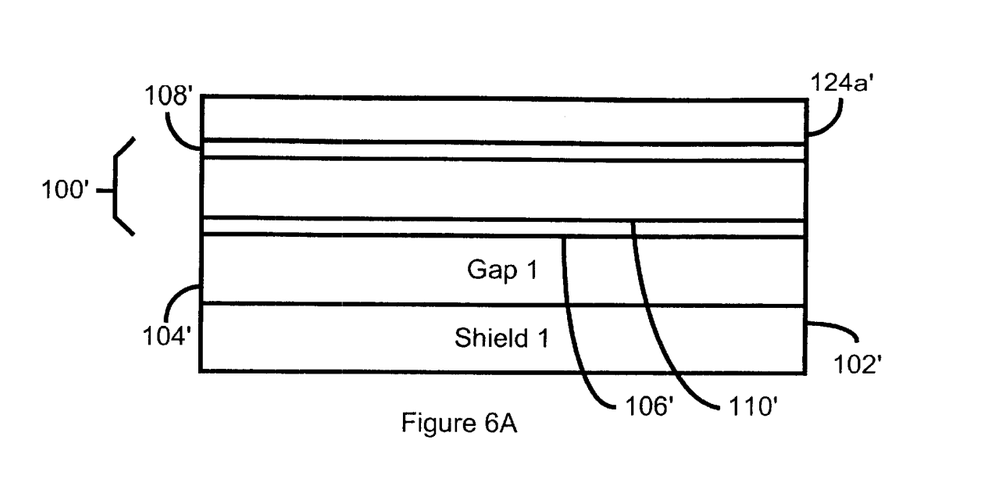
FIGS. 6A through 6G depict one embodiment of a TMR sensor in accordance with the present invention during fabrication.

FIG. 5 depicts a more detailed flow chart of the method 350 in accordance with the present invention. The method 350 will also be described in conjunction with FIGS. 6A through 6G, which depict another embodiment of a TMR sensor 100' during processing. Referring to FIGS. 5 and 6A–6G, the first shield is provided, via step 352. The first gap is provided on the first shield, via step 354. An optional seed layer for the free layer can then be deposited, via step 356. Preferably, the seed layer is composed of approximately twenty to fifty Angstroms of Tantalum. The material for the free layer is then deposited, via step 358. An optional capping layer can then be provided on the free layer, via step 360. A first portion of the second gap, called gap 2a, is then deposited on the capping layer, via step 362. The gap 2a protects the free layer during subsequent processing, such as the ion milling, discussed below. FIG. 6A depicts the TMR sensor 100' after deposition of the gap 2a layer, 124a'. Also shown are the first shield 102', the first gap 104', the optional seed layer 106', the free layer 110' and the optional capping layer 108'.

Figure 6B:
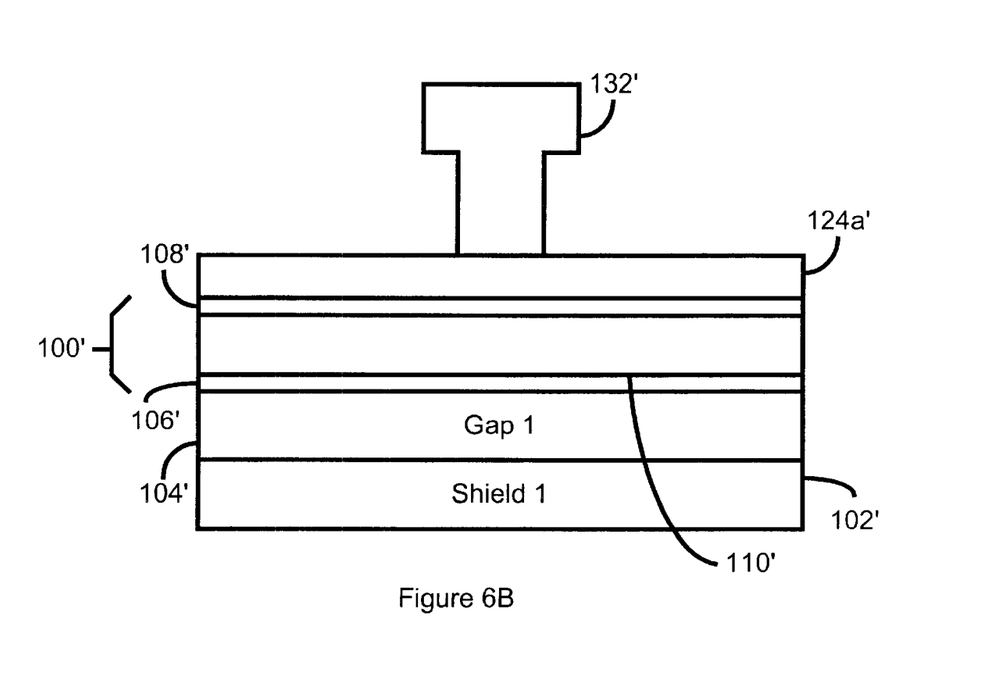
Figure 6C:
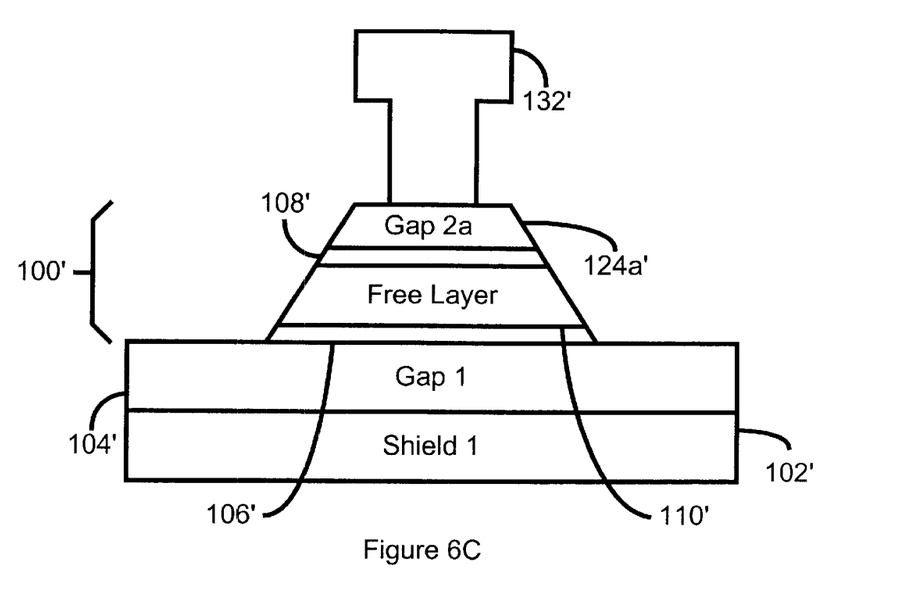

The track width is defined, via step 364. Step 364 preferably includes providing a bilayer photoresist structure 132', as depicted in FIG. 6B. The gap 2a layer 124a', the capping layer 108', the free layer 110' and the seed layer 106' are then etched using the bilayer photoresist structure 132' as a mask, also in step 364. Thus, the width desired for the free layer 110' is determined using step 364. These layers 106', 110', 108' and 124a' are then ion milled to allow the TMR junctions to be formed at the edges of the free layer 110', via step 366. FIG. 6C depicts the TMR sensor 100' after the track width has been defined in step 364 and the free layer has been milled in step 366.

Figure 6D:
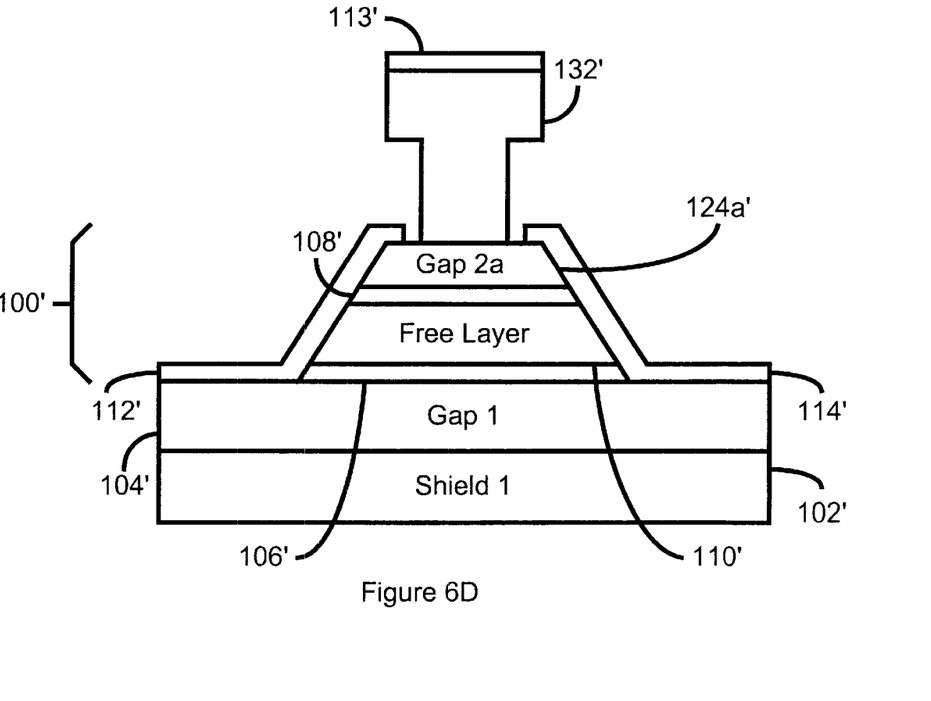
Figure 6E:
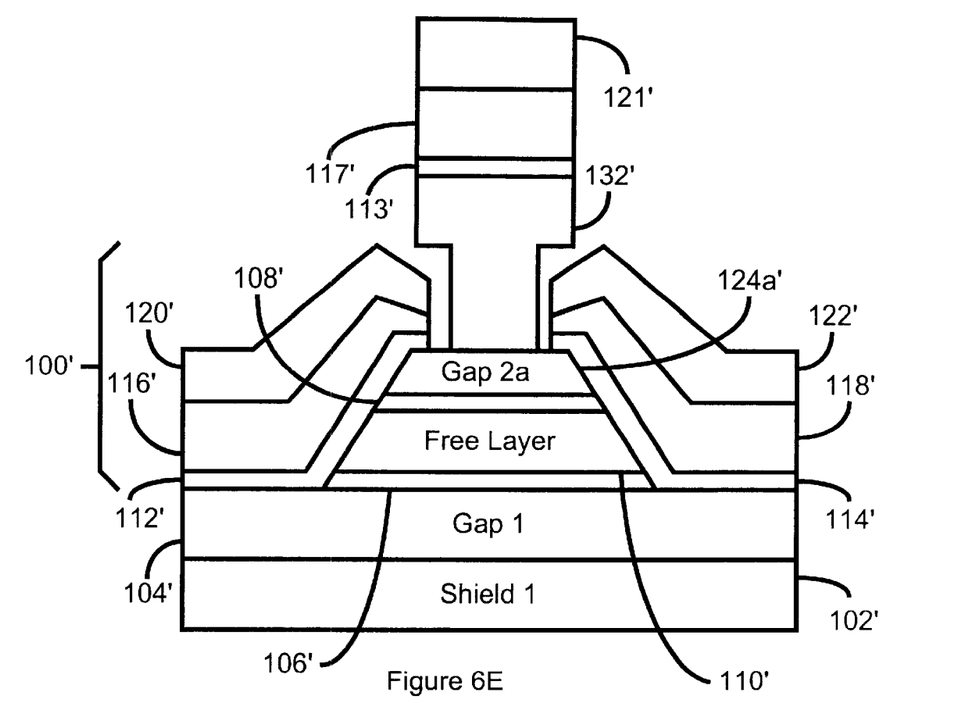

A single insulating layer that will form the barrier layers is then deposited, via step 368. FIG. 6D depicts the TMR sensor 100' after the insulating layer has been deposited. The single insulating layer is shown as being made up of layers 112' and 114' that will be the barrier layers for the TMR sensor 100' and the layer 113' on the bilayer photoresist structure 132'. A single magnetic layer that will become the pinned layers for the TMR sensor 100' is deposited, via step 370. A single AFM layer that will become the AFM layers for the TMR sensor 100' is deposited, in step 372. FIG. 6E depicts the TMR sensor 100' after the steps 370 and 372 have been completed. The single magnetic layer that will be used for the pinned layers is indicated by layers 116', 117' and 118'. The single AFM layer that will be used for the AFM layers of the TMR sensor 100' is depicted as layers 120', 121' and 122'. Thus, the portions 113', 117' and 121' of the barrier layer, the magnetic layer and the AFM layer, respectively, are on the bilayer photoresist structure 132'.

Figure 6F:
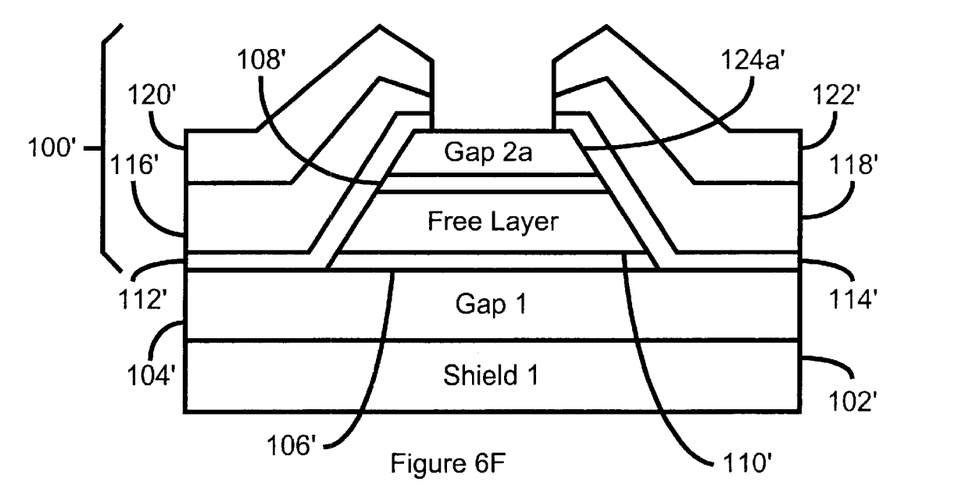

A lift-off process is then performed, via step 374. The lift-off process performed in step 374 removes the bilayer photoresist structure 132. Thus, the portions 113', 117' and 121' of the barrier layer, the ferromagnetic layer and the AFM layer, respectively, are also removed. FIG. 6F depicts the TMR sensor 100' after the lift-off process is performed in step 374. As can be seen in FIG. 6F, two barrier layers 112' and 114', two pinned layers 116' and 118' and two AFM layers 120' and 122' remain. Thus, TMR junctions are formed at the edges of the free layer 110'. A first TMR junction is formed by an edge of the free layer 110', the first barrier layer 112' and the first pinned layer 116', while a second TMR junction is formed by another edge of the free layer 110', the second barrier layer 114' and the second pinned layer 118'. The leads are provided, via step 375.

Figure 6G:
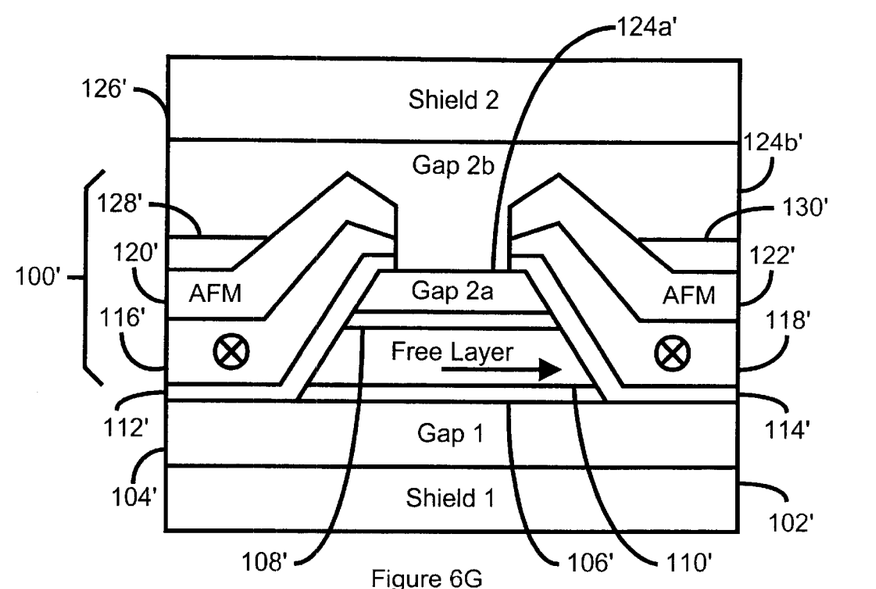

A second portion of the second gap, termed gap 2b, is then deposited, via step 376. The magnetic orientations of the AFM layers 120' and 122' are set, via step 378. The magnetic orientations of the AFM layers 120' and 122' are set such that the magnetization of the pinned layers 116' and 118', respectively, are perpendicular to the air bearing surface and, preferably, perpendicular to the direction current flows. The second shield is also provided, via step 380. The completed TMR sensor 100', including the gap 2b 124b' and the second shield 126, is depicted in FIG. 6G. The leads to the TMR sensor 100' are also depicted in FIG. 6G, however the leads structure of Ta/Au/Ta for GMR heads could also be used to make contact to the free layer 110' in this embodiment. The leads or 100' has essentially the same benefits as the TMR sensor 100.

Figure 6H:
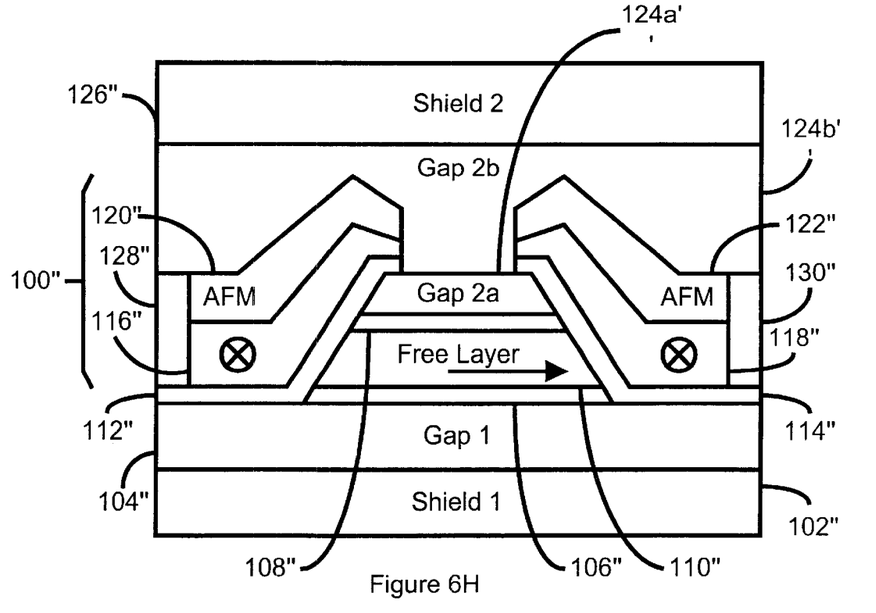
FIG. 6H depicts another embodiment of a TMR sensor in accordance with the present invention.

FIG. 6H depicts another embodiment of the TMR sensor 100". The TMR sensor 100" is substantially the same as the TMR sensors 100 and 100'. Therefore, the TMR sensor 100" has substantially the same benefits as the TMR sensors 100 and 100'. However, the leads 128" and 130" are coupled to the outside edge of the TMR sensor 100", rather than being above the AFM layers 120" and 122". Furthermore, although the leads 128 and 130, 128' and 130' and 128" and 130" are depicted as touching the AFM layers 120 and 122, 120' and 122' and 12" and 122" in FIGS. 2B, 6G and 6H, respectively, the leads 128 and 130, 128' and 130' and 128" and 130" are preferably a non-magnetic metal. Furthermore, although the leads 128 and 130, 128' and 130' and 128" and 130" are depicted in FIGS. 2A, 6G and 6H are as seen from the air-bearing surface, the leads 128 and 130, 128' and 130' and 128" and 130" need not reach the air-bearing surface.

Thus, the methods 300 and 350 used to provide the TMR sensors 100 and 100' are similar to techniques used in forming conventional GMR sensors. Thus, the methods 300 and 350 can be easily integrated into current processing technology. The methods 300 and 350 can provide a superior TMR sensor 100 or 100' having a more uniform bias current, having a higher signal and that is suitable for use in high areal density recording applications, including for areal densities of one hundred Gb/in$^2$. The methods 300 and 350 are also relatively simple to carry out, facilitating processing of the TMR sensors 100 and 100'.

A method and system has been disclosed for providing a TMR sensor which is suitable for high areal density recording applications and is relatively simple to manufacture. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetoresistive sensor for reading data from a recording media comprising:

a first barrier layer and a second barrier layer;

a free layer disposed between the first barrier layer and the second barrier layer, the free layer being ferromagnetic;

a first pinned layer and a second pinned layer, the first pinned layer and the second pinned layer being ferromagnetic, the first barrier layer being disposed between the first pinned layer and the free layer, the second barrier layer being disposed between the second pinned layer and the free layer;

a first antiferromagnetic layer and a second antiferromagnetic layer, the first pinned layer being magnetically coupled to the first antiferromagnetic layer, the second pinned layer being magnetically coupled to the second antiferromagnetic layer;

a first gap layer; and a second gap, the free layer being sandwiched between the first gap layer and the second gap;

the first barrier layer being sufficiently thin to allow tunneling of charge carriers between the first pinned layer and the free layer, the second barrier layer being sufficiently thin to allow tunneling of charge carriers between the second pinned layer and the free layer;

wherein the free layer has a first edge and a second edge, a portion of the first barrier layer being disposed at the first edge of the free layer, a portion of the second barrier layer being disposed at the second edge of the free layer.

2. The magnetoresistive sensor of claim 1 wherein the free layer further has a width, the width being less than or equal to approximately 0.1 micrometers.

3. The magnetoresistive sensor of claim 1 wherein the free layer has a first edge and a second edge, the first barrier layer being adjacent to the first edge and the second barrier layer being adjacent to the second edge.

4. The magnetoresistive sensor of claim 1 wherein the first barrier layer and the second barrier layer are oxides.

5. The magnetoresistive sensor of claim 1 wherein the first pinned layer and the second pinned layers include Co.

6. The magnetoresistive sensor of claim 1 wherein the first pinned layer and the second pinned layers include CoFe.

7. The magnetoresistive sensor of claim 1 wherein the first pinned layer and the second pinned layers include Ni.

8. The magnetoresistive sensor of claim 1 wherein the first pinned layer and the second pinned layers include NiFe.

* * * * *